Nov. 12, 1940.   M. SCHWARTZ   2,220,917
CAMERA
Filed June 22, 1937
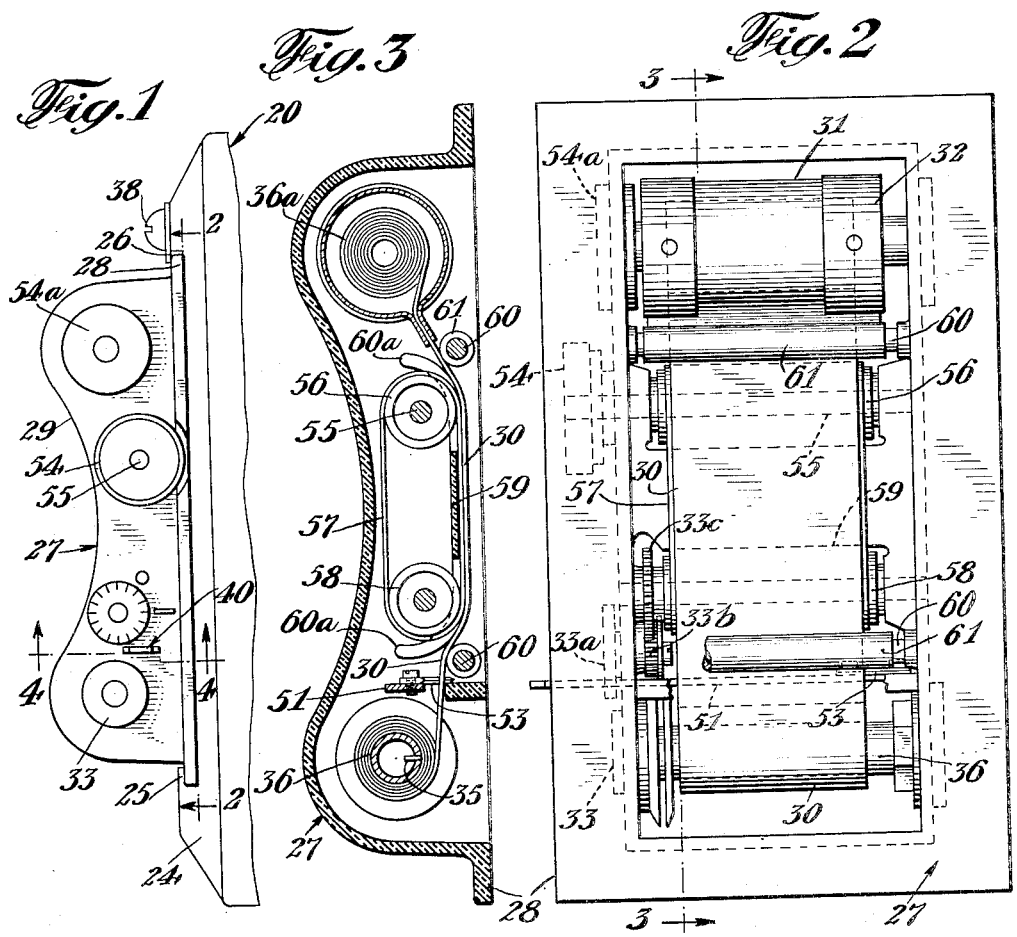
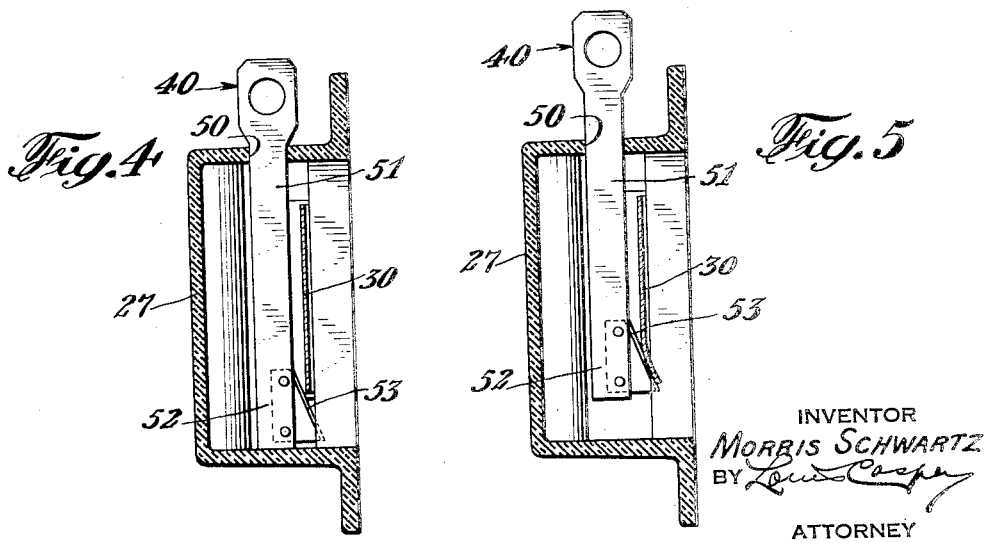
INVENTOR
MORRIS SCHWARTZ
BY Louis Cooper
ATTORNEY Patented Nov. 12, 1940

2,220,917

UNITED STATES PATENT OFFICE 2,220,917

CAMERA

Morris Schwartz, Sunnyside, N. Y., assignor to The Kalart Company, Inc., New York, N. Y., a corporation of New York Application June 22, 1937, Serial No. 149,558

5 Claims. (Cl. 95—34)

My invention relates to cameras whereby the means for winding or transferring film therein may be made more effectively and with greater precision of the movement thereof, and also with especial reference to the particular portion of the film that is moved into position within the area of exposure for picture taking.

A further object of this invention is to provide means for simplifying the winding up process of the film whereby instead of having sprocket perforations on said film, a Scotch adhesive tape in the form of an endless band is used in connection with the movement of said film. This particular phase of the invention is applicable for either "still" or moving picture type cameras, or for projectors and other machinery used for processing the film.

A further object of this invention is to apply an antihalation medium to the film without adding bulk or applying permanently a material to said film or its emulsion. The backing of said film by means of Scotch tape or similar adhesive tape at the area of exposure as shown renders said area resistant to halation due to the opacity of the Scotch tape material and its close adhesion to the back of the film.

A further object of this invention is the utilization of said Scotch tape or its equivalent for use in moving picture work with regard to the sound track on such moving picture film. The anti-halation effect just described applies equally upon said sound track thereby minimizing distortions which may occur due to the halation influence upon the film aforesaid.

It is often desirable to provide means to enable the ready removal of the negative upon which said exposure had been made for developing.

To provide such a facility, means are made available for cutting that portion of the exposed film from the rest of the roll or unexposed portion of film contained in the film holder of said camera. The position of the cutter is such that said cutting of the film is accomplished without any wastage of the film whatsoever, and the cut portion of the film is made immediately available for development, the unexposed portion of the film remaining in the camera is left in position for immediate future exposure. The movement of said film toward the exposed chamber is accomplished by means of the propulsion feature of the endless Scotch tape band.

Referring to the figures—

Fig. 1 illustrates a section of a camera of standard design showing the novel film holder attached thereto at the rear of the camera in lieu of the glass or flat negative plate holder.

Fig. 2 is a plan view of Fig. 3 said figure being viewed on a plane of 90° from that of the Fig. 3.

Fig. 3 is a section through the attachment taken on a line 3—3 of Fig. 2.

Fig. 4 is a detail view of the film cutting knife.

Fig. 5 is similar to Fig. 4 and illustrates the manner in which the film is cut.

Referring to Fig. 1, the numeral 20 indicates a section of the body of a standard camera.

The rear section 24 of the camera 20 is provided with a pair of sliding notches 25 and 26. The aforesaid notches serve in standard cameras to insert a glass or flat film plate holder at the rear of said camera. With the present invention, the device 27 is mounted upon the rear of said camera. Said device consists of a flat sliding plate 28 and the container 29 mounted thereon for holding the film 30.

Referring to Fig. 4. A cutting knife 40 is provided to cut the exposed portion of the film from the rest of the roll. The film holder 29 is provided with a slot 50. A blade 51 is slidably mounted in said slot. The lower end 52 of the blade 51 has a knife 53. When the blade 53 is moved upward as shown in Fig. 5, the knife 53 will cut the film 30.

Referring to Fig. 3 the film 30 in this case is wound up inside the device 27. The film 30 is moved by a knob 54 which is secured to a shaft 55 that rotates the roller 56. An endless band 57 of Scotch tape is placed over the roller 56 and roller 58. The said band is always in close contact with the film 30 and along the yieldably adhering surface 59. A pair of guide rollers 60 and 61 are provided in this particular case to further secure the film 30 in position. The movement of the film 30 is stabilized and aided in remaining in place by means of the gear 33ᶜ engaging in the idler gear 33ᵇ. The shafts of both intermediate gear 33ᵇ and roller 36 have adjusting knobs 33 and 33ᵃ respectively, said knobs serve as manual adjusting means in maintaining the movement of the film 30 in the trawl thereof across the device from the spool 36 to the spool 36ᵃ.

A film stripper tongue 60ᵃ serves to separate or strip the film from the Scotch tape backing when said tape is moved toward the rewinding spool 36ᵃ, said spool being under spring tension and will, therefore, wind up the film as it is transferred to said winding spool. The knob 54ᵃ may also be used as a supplemental winding medium to wind the spool 36ᵃ.

This manner of operation eliminates the necessity of utilizing sprockets and sprocket hole perforations in connection therewith in moving the film, this function being performed by the adhesion of said Scotch tape upon said film thereby holding said film in position and said adhesions sufficiently yieldable to permit the free movement of said film when it is moved across said device from one side roller to the opposite side roller.

The aforesaid arrangement of transporting film by means of an endless band of Scotch tape is applicable to moving film or like bands or tapes for other purposes than that of films used in the manner described.

It will thus be seen that the elimination of sprocket holes or perforations in the film results in considerably less wear upon said moving film with a consequent increase in the useful life thereof.

The travel of ordinary moving picture film when impelled by sprocket wheels causes eventual wear in the sprocket hole perforations in said film; and said hole perforations also become elongated in course of continued travel use causing said film to move out of gage resulting in more or less distortions either in picture taking or picture projection.

The endless Scotch tape bands placed around the supporting rollers are readily and inexpensively replaceable.

While the invention has been described in detail with specific examples, such examples are illustrative and are not given as limitations, since modifications within the spirit and scope of the invention will be apparent to those skilled in the art. Hence, the invention is to be understood as limited only as indicated in the appended claims in which the intent is to set forth all the novelty over the prior art.

Now having described my invention what I claim is:

1. In a photographic device having magazine film holder means attachable thereto, said holder means containing a rotatable film spool and rewinding spool, propeller means for transferring said film from said film spool to said rewinding spool, said last named means including the movement of an endless band of Scoth tape or like adhesive element, said adhesive element having the property of adhering to said film and leaving no impression thereon when released from said adhesive element, guiding means in said film holder means to press the film against said adhesive substance on said band; and means for stripping or releasing said film from said band incident to the transfer movement of the film aforesaid.

2. In a photographic camera, a magazine film holder attachable thereto, said film holder to contain a rotatable film spool and a rewinding spool, the film being movably transferred to said rewinding spool through the medium of propeller means engageable with said rewinding film spool; an endless band moved by said propeller means, said band mounted in said holder for yieldably supporting a section of said film, said band including a surface backing of Scotch tape or like adhesive element, said tape surface having the property of adhering to said film through the medium of film guiding means in said film holder; film cutter means contained in said magazine film holder and contiguous to said film, said cutter means for cutting said film whereby the exposed portion of said film may be separated from the unexposed portion of said film, after said exposed film shall have been stripped or released from said backing of Scotch tape, through the medium of film stripping or releasing means and under impulse movement of the propeller means aforesaid.

3. In a photographic device, a magazine film holder attachable thereto, said film holder to contain a roll of film, said film moved across said holder from one roller to a second roller; an endless band contiguous to said film holder, said band having an outer surface of adhesive tape or like adhesive substance, said adhesive substance having the property of adhering to said film and leaving no impression thereon, after having been released from said band, said film caused to be adhesively attached to said band thereby holding a portion of film in smooth flat position for picture exposure, auxiliary idler rollers in said film holder applied to the face portion of said film to assist in maintaining said film in smooth flat position against said endless band; motively operated means on said device for forwardly moving said film; and stripping or releasing means to cause said film to be released from said band upon said forward movement thereof after each picture exposure.

4. In a photographic apparatus, a magazine film holder having a roll of film therein, said film being transferred across said holder to a second roller; an endless band having an outer surface of Scotch tape or like yieldably adhesive substance contiguous to said film holder, the surface of said band adhesively attachable to a section of said film whereby said section of film is held in flat smooth position preparatory for picture exposure; motively operative means on said apparatus for moving said endless band whereby said film is caused to move forwardly after each picture exposure, said film being stripped or released from said band upon the forward movement of the film aforesaid.

5. In a photographic device having a film holder attached thereto, said holder to contain a roll of film, said film being moved across said film holder to a second roller through the medium of propeller means, a movable band in said device and contiguous to said film, said band having on the surface thereof a portion of opaque Scotch tape or like adhesive substance, said band releasably holding a section of said film within the exposure area thereof, said film smoothly adhering to said band without wrinkle or unevenness and thereby eliminating halation effect upon said film, said propeller means in operable connection with said movable band to cause said band to move simultaneously with the movement of said film; and releasing or stripping means adjacent to said band for releasing said film upon the forward movement thereof.

MORRIS SCHWARTZ.